(12) United States Patent
Hallett

(10) Patent No.: US 9,322,385 B1
(45) Date of Patent: Apr. 26, 2016

(54) HYDRO VORTEX ENABLED TURBINE GENERATOR

(71) Applicant: Martin D. Hallett, Port Edwards, WI (US)

(72) Inventor: Martin D. Hallett, Port Edwards, WI (US)

( * ) Notice: Subject to any disclaimer, the term of this patent is extended or adjusted under 35 U.S.C. 154(b) by 751 days.

(21) Appl. No.: 13/761,885

(22) Filed: Feb. 7, 2013

(51) Int. Cl.
| | |
|---|---|
| *F03B 13/12* | (2006.01) |
| *F03B 3/18* | (2006.01) |
| *F03B 3/02* | (2006.01) |
| *F03B 11/02* | (2006.01) |

(52) U.S. Cl.
CPC . *F03B 3/186* (2013.01); *F03B 3/02* (2013.01); *F03B 11/02* (2013.01)

(58) Field of Classification Search
CPC ............ F03B 3/02; F03B 7/003; F03B 11/02; F03B 13/10; F03B 13/26; F05B 2240/40; F05B 2240/97
USPC ............................ 415/3.1, 906, 909, 207, 221
See application file for complete search history.

(56) References Cited

U.S. PATENT DOCUMENTS

| | | | |
|---|---|---|---|
| 4,076,448 | A | 2/1978 | Sanders, Jr. |
| 4,101,246 | A | 7/1978 | Erickson |
| 4,452,046 | A | 6/1984 | Valentin |
| 4,452,562 | A | 6/1984 | Hsu |
| 4,464,580 | A | 8/1984 | Miller et al. |
| 6,943,461 | B2 | 9/2005 | Kaploun |
| 7,162,770 | B2 | 1/2007 | Davidshofer |
| 7,204,672 | B2 | 4/2007 | Sewell |
| 2007/0096472 | A1 | 5/2007 | Mondl |

*Primary Examiner* — Dwayne J White
*Assistant Examiner* — Jason Mikus
(74) *Attorney, Agent, or Firm* — Michael I. Kroll

(57) ABSTRACT

The Vortex Hydro Turbine takes water through two upper inlets and one lower inlet from the current in which it is submerged. The upper inlets direct the water flow into cylindrical chambers with a spiral bottom to create a vortex. The top of the chambers are specifically left open to allow the water to exit and to reintegrate into the existing native flow. This movement of the water creates a low pressure area within the center of each of the chambers which is transferred to the back side of a turbine blade system through depending tubes. Water flows thru the turbine blade via the lower inlet and out the tail pipe. The low pressure from the depending tubes, aft of the blades, increases the water velocity through the blades for increased power output. The system can be scaled as a standalone unit or as an array.

8 Claims, 9 Drawing Sheets

HYDRO VORTEX ENABLED TURBINE GENERATOR

RELATED APPLICATIONS

This application is a Continuation-In-Part of U.S. patent application Ser. No. 12/558,079, having a filing date 11 Sep. 2009.

Please incorporate by reference all information in said provisional application into this instant application.

BACKGROUND OF THE INVENTION

1. Field of the Invention

The present invention relates generally to turbines and, more specifically, to free stream hydro-kinetic energy.

Depicted in the accompany drawings is an enablement of the aforementioned only for illustrative purposes in describing the instant invention.

2. Description of the Prior Art

There are other devices designed for using vortexes. Typical of these is U.S. Pat. No. 4,076,448 issued to Sanders, Jr. on Feb. 28, 1978.

Another patent was issued to Erickson on Jul. 18, 1978 as U.S. Pat. No. 4,101,246. Yet another U.S. Pat. No. 4,452,046 was issued to Valentin on Jun. 5, 1984 and still yet another was issued on Jun. 5, 1984 to Hsu as U.S. Pat. No. 4,452,562.

Another patent was issued to Miller, et al. on Aug. 7, 1984 as U.S. Pat. No. 4,464,580. Yet another U.S. Pat. No. 6,943,461 was issued to Kaploun on Sep. 13, 2005. Another was issued to Davidshofer on Jan. 16, 2007 as U.S. Pat. No. 7,162,770. Another U.S. Pat. No. 7,204,672 was issued on Apr. 17, 2007 to Sewell and still yet another application was published on May 3, 2007 to Mondl as U.S. Patent Application Publication No. 2007/0096472.

U.S. Pat. No. 4,076,448

Inventor: Davis A. Sanders, Jr.

Issued: Feb. 28, 1978

A water turbine for generating power is disclosed utilizing a multiple scroll housing for gathering, concentrating and guiding equal amounts of water about the turbine wheel or impeller.

The 488 patent states low speed water is 15 mph, which in the range of the highest natural flow of tides and currents. The present invention works in lower speed water 3.3 mph. At this speed the upper inlet of the 488 patent would not transform the momentum of the water into angular velocity. The inlet would slow the water even further resulting in the blades not turning and not creating any interaction between the two sets of blades, which was disclosed in the physical testing our first unit that incorporated similar elements that we directed to create a force to act on the blades instead of acting directly on the blades.

The 488 patent creates an artificial vortex by the interaction of the two blade systems neither of which interact directly with the natural flow of the water, and supposedly creates more power by their interaction. The present invention uses one blade system directly in the natural stream of the water that creates the vortex by the redirection of the natural flow of the water, to impart a low pressure state within a turbine blade system exhaust wake thereby enabling an increase volumetric flow through said blade system.

U.S. Pat. No. 4,101,246

Inventor: John W. Erickson

Issued: Jul. 18, 1978

A vortex jet pump is provided in which circumferential flow in a fluid flow passage through the pump is induced by a tangential power liquid jet inlet into the passage between its suction inlet and its outlet. The pump, which has no moving parts, has a housing providing a fluid flow passage between a pumped fluid suction inlet and a pumped fluid outlet downstream therefrom. Downstream from the power liquid jet inlet there is a throat in the passage having a flow cross section less than the flow cross section of the passage adjacent the power inlet jet inlet. A diffuser section is provided in the passage downstream from the throat and includes means for converting primarily circumferential fluid flow to primarily axial fluid flow in the passage. Preferably such means comprises fixed vanes in the passage downstream for the power liquid let inlet. Means are provided upstream from the power liquid jet inlet for injecting fluid into the passage in a primarily tangential direction for initiating circumferential flow in the passage. The velocity head of the injected fluid is less than the velocity head of the power liquid injected through the jet inlet to minimize cavitation.

U.S. Pat. No. 4,452,046

Inventor: Zapata M. Valentin

Issued: Jun. 5, 1984

A system for obtaining energy by means of fluid flows resembling those of a natural cyclone or anti-cyclone comprises a cyclonic conversion tower constituted by a group of convectors all situated round an axis toward which there are directed vertical membranes or screens contained in trumpet-shaped revolution bodies. At its top or bottom the conversion tower optionally bears deflectors or diffusers which increase output. Devices for conversion of electrical or mechanical energy from the kinetic energy of the flow are located at both the top and the base of the tower of convectors. The convection tower optionally is situated on a base which permits the passage of solar radiation with the aim of utilizing its energy, the assembly being completed by a conventional heating system for alternative use.

The '046 patent creates cyclonic or vortex fluid movement by heating and cooling of the fluid, through the sun and optional fossil fuel systems. This system does not shape the vortex it only uses the natural formation of the flow of heated and cooled systems that then act on the blade systems installed. Convectors are used to create the flow not the fluid its self. Also the vortex or cyclonic action works directly on the blades instead of being used indirectly by the present invention by creating the vortex through redirection of the natural flow of the water to impart a low pressure state within a turbine blade system exhaust wake.

U.S. Pat. No. 4,452,562

Inventor: Cheng-Ting Hsu

Issued: Jun. 5, 1984

A tornado type wind turbine has a vertically disposed wind collecting tower with spaced apart inner and outer walls and a central bore. The upper end of the tower is open while the lower end of the structure is in communication with a wind intake chamber. An opening in the wind chamber is positioned over a turbine which is in driving communication with an electrical generator. An opening between the inner and outer walls at the lower end of the tower permits radially flowing air to enter the space between the inner and outer walls while a vertically disposed opening in the wind collecting tower permits tangentially flowing air to enter the central bore. A porous portion of the inner wall permits the radially flowing air to interact with the tangentially flowing air so as to create an intensified vortex flow which exits out of the top opening of the tower so as to create a low pressure core and thus draw air through the opening of the wind intake chamber so as to drive the turbine.

The '562 patent is designed to yield energy by means of compressing a free flowing air current through a housing having a vertical cylindrical upper portion with a bore in fluid communication with a lower tangential air inlet having a driven turbine blade positioned therebetween and an upper chamber inlet generating a radial air flow through a porous bore wall to reduce vortex flow pressure generated by the tangential air flow from the lower chamber inlet, since water is not compressible the unit would not work in a free flowing stream.

Furthermore, the '562 vortex is directly integrated with the blade system, whereas the present invention's vortex creates low pressure that is then transmitted to the blade system.

U.S. Pat. No. 4,464,580

Inventor: Helmut Miller, et al.

Issued: Aug. 7, 1984

In a turbo-machine having a rotor member movable relative to a stationary housing member there is provided a substantially ring-shaped or annular seal between both of these members and serves to seal pressurized water from an external space or region. One of both of these members possesses a sealing surface against which there is pressed a sealing body of the seal which is inserted into the other member, the sealing body being for instance constituted by a lip seal. Improved lubrication, reduced friction and enhanced service life of the seal is attained in that, the sealing surface has fed thereto a friction-reducing liquid, for instance by means of radial grooves provided in the sealing surface or by means of bores opening into the sealing surface.

U.S. Pat. No. 6,943,461

Inventor: Solomon Kaploun

Issued: Sep. 13, 2005

A wind vortex tower is enhanced by kinetic energy and heat of quasi-tangential and upward jets of saturated steam energizing, accelerating tornado-type flow and supporting stable electricity generation during the insufficient winds and calm. For action instead of absent wind at starts and operation over a long time, a staged system of flexible nozzles injects the steam jets into the zones of vortex channel. The system controls the tornado-type flow in the vorticity energizer, swirlers of sucked ambient air, condensate separators, re-enhancer of airflow and top diffuser. The steam is flashed from partially stored condensate heated nearly to 100.degree. C. The condensate is partially delivered after centrifugal separation from saturated vortex core. The outside water heating system has one or two of compatible renewable, waste and secondary, or initial heat sources, and is intensified via sucking of heated water by vortex flow. A large-rating flow-through electric generator has an alternating magnetic whirl formed by magnetic concentrators whirled near vortex core and a three-phase stator with switched modules. The simplified towers are used for water and conditioned air production.

The '461 patent discloses creating vortexes in a steam system to increase the efficiency of the system. The vortexes are used to supplement power output not to create the power. This system uses no natural flow and would not work in free flowing water.

U.S. Pat. No. 7,162,770

Inventor: Don Davidshofer

Issued: Jan. 16, 2007

A vacuum cleaner having a nozzle, a handle pivotally attached to the nozzle, and a suction motor that has an inlet, and is adapted to generate a working air flow through the nozzle. The vacuum includes a separation system having an outer wall and a closed tube having at least a portion of its length located within the wall, and forming a separation chamber between the wall and the closed tube. The separation chamber has an inlet, in communication with the nozzle that is adapted to impart a tangential component to the air flow as it flows through the separation chamber. A hollow tube is generally coaxially aligned with the closed tube and has a tube inlet at an end adjacent the closed tube and a tube outlet at an end opposite the closed tube. The tube outlet is in fluid communication with the suction motor inlet.

The '077 patent discloses a motor and propeller to create and harness a vortex to improve the flow in the system, which uses no natural flow and therefore would not work in water.

U.S. Pat. No. 7,204,672

Inventor: Gary Sewell

Issued: Apr. 17, 2007

A multi-modal forced vortex device is described having a top plate and a side wall creating a partially enclosed volume. The top plate includes one or more adjustable fluid openings to permit, or restrict, fluid flow into and out of the partially enclosed volume. Rotating blades housed within the partially enclosed volume are manipulated (through control of their pitch and, possibly, their speed) in conjunction with the adjustable fluid openings to generate a variable magnitude attractive force in a first mode, a variable magnitude down or pushing force in a second mode, a variable magnitude up or lifting force in a third mode or variable magnitude yaw, pitch and roll forces in a fourth mode.

The '672 patent discloses vortexes and blades used to create lift and drag, for a hover craft type vehicle that inputs power to create the vortex. It uses no natural flow, although it may work above water it would not work in water.

U.S. Patent Application Publication Number
2007/0096472

Inventor: Fritz Mondl

Issued: May 3, 2007

The invention relates to an apparatus for generating electric power in freely flowing rivers, comprising a housing consisting of an outside housing (6) and an inside housing (7) having an outlet (10) formed as a suction pipe, with cavities (17) being provided between the outside housing (6) and the inside housing (7) in order to stabilize the apparatus close beneath the water surface, and with at least one turbine (12) arranged in the inside housing (7) which is flowed through axially and is connected with a generator (14), and with a traction means (2) for anchoring the apparatus. A robust apparatus which is especially protected against hazards caused by high water can be achieved in such a way that the traction means (2) consists of at least one longer anchor cable (2a), with the anchor cable (2a) being anchored in the used position in an inclined manner in front of the apparatus in the ground of the river, and of at least one shorter rise-limiting cable (2b).

While these vortex systems may be suitable for the purposes for which they were designed, they would not be as suitable for the purposes of the present invention, as hereinafter described.

The aforementioned systems while employing vortices do not deal with power generation from free flowing streams and none of their assumptions or directions were used in the design or Idea of this system.

SUMMARY OF THE PRESENT INVENTION

Hydrokinetic energy is a promising candidate for augmenting the nation's needed supply of carbon-free energy sources. It could provide a new supply of clean, domestic, renewable energy, much of which would be located close to the load centers of our major cities on the coasts and inland waterways. It has taken over 100 years to develop the 97,000 megawatts (MW) of hydropower capacity in the United States, which constitutes ten percent of the country's electricity supply. According to some estimates, hydrokinetic technologies have the potential, if fully developed, to double the amount of hydropower production to twenty percent of the national supply.

The object of this invention is to leverage the power of water adhering to the simplified kinetic energy formula $P=\frac{1}{2} AdV^3$ where A=area, d=density and V=velocity. So by doubling velocity we triple the output of the system, Bearing in mind Betz limit we cannot just use a shrouded system to do this because of the conservation of energy the system will balance out, giving us the overall same amount of power for a given area.

The hydro turbine of the present invention channels the water around the front of the unit having a shape that accelerates the flow of the water by placing an obstruction incorporating a leading edge in its way (front of the unit) thereby using Bernoulli's, simply velocity=fn(1/Area). The accelerated water then enters inlets placed on both sides of the unit leading to chambers designed to take the flow and convert a portion to provide a vertical element. Once in the chamber, the water is confined and used to create a vortex. This vortex has a low pressure area at its center, which is transmitted to the blade system located in a subjacent unit. The low pressure is impinged on the water stream located behind a standard blade system mounted in a tube to evacuate stalled (or reduced speed) water. The tube funnels a free flowing stream of water through a standard blade system while the low pressure is applied through a tube aperture just aft of the blades. By increasing the velocity through the blades and evacuating the water behind the blades instead of the blades stalling they continue to generate power at a higher rate. The hydro turbine unit of the present invention generates an increase in power which allows the use of fewer units per kW generation, thereby decreasing construction costs, minimizing environmental impact, and reducing operational costs.

A primary object of the present invention is to provide a system that creates a pair of vortexes having a low pressure area impinged within the fluid flow behind a turbine blade system to accelerate the fluid flow through said blade system.

Another object of the present invention is to provide a system that creates a pair of vortexes having a low pressure area impinged within the posterior turbine blade fluid flow inducing a pair of siphon flows therefrom venting through respective vortex chamber outlet ports that accelerates fluid flow through the turbine blades increasing blade rotation and energy output of the turbine-blade coupled energy generating device.

Yet another object of the present invention is to provide a Vortex Hydro Turbine that utilizes the property of water that being non compressible will gain speed as it flows around an object.

Still yet another object of the present invention is to provide a Vortex Hydro Turbine housing incorporating a vortex unit and a turbine unit.

An additional object of the present invention is to provide a Vortex Hydro Turbine wherein said vortex unit further provides a shroud housing having no moving parts.

A further object of the present invention is to provide a Vortex Hydro Turbine wherein said vortex unit shroud housing provides free flowing fluid inlets and free flowing fluid outlets.

A yet further object of the present invention is to provide a shroud/housing having a leading edge that slopes towards a respective vortex unit intake port.

A still yet further object of the present invention is to have a shroud housing shape that accelerates a portion of a free flowing stream of water into a pair of spaced apart vortex unit inlet ports.

Another object of the present invention is to provide a shroud housing having a top surface to contain the water until it can be used by the vortex unit.

Yet another object of the present invention is to provide the shroud housing top surface with egress ports for each vortex unit's vortex chamber.

Still yet another object of the present invention is to provide the shroud housing egress ports with a leading edge foil to lift the environmental water over the outlet of the vortex chambers to stabilize the output of the vortex chambers.

An additional object of the present invention is to provide a vortex unit having a pair of spaced apart intake apertures as fluid ingress for vortex creation.

A further object of the present invention is to provide a vortex unit having a pair of upwardly extending ramps terminating at a respective vortex unit intake port.

A yet further object of the present invention is to provide a vortex unit having a pair of curvilinear walls extending from said vortex unit intake ports creating a vortex chamber within said vortex unit.

A still yet further of the present invention is to provide a vortex unit having a plurality of angled cantilevered flanges extending from the vortex chamber walls to aid and maintain vortex creation within the free flowing fluid.

Another object of the present invention is to provide a vortex unit with each vortex chamber having a conduit providing for fluid communication between the pair of vortex chambers and the fluid flow behind the turbine blade unit.

Yet another object of the present invention is to provide a vortex unit vortex chamber having an upwardly spiraling base circumferently encompassing a downwardly extending aperture passing through the turbine unit wall with the rim of said aperture having a depending ramp with a distal end positioned within the turbine unit's free flowing fluid channel.

Still yet another object of the present invention is to provide a vortex unit with each vortex chamber having a depending conduit providing fluid communication between the pair of vortex chamber and the fluid flow behind the turbine blade unit.

An additional object of the present invention is to provide a turbine unit having a venturi-like conduit with an inlet port and an outlet port with a blade system therebetween.

A further object of the present invention is to provide a venturi-like conduit inlet port, preferably having a conic shape, whereby a free flowing fluid provides motive force for turning said blade system.

A yet further object of the present invention is to provide a blade system having a ring gear in mechanical communication with a generator for generating electricity.

A still yet further object of the present invention is to provide said venturi-like conduit with a pair of apertures behind the blade system that are in fluid communication with each of said vortex chamber depending conduits.

Another object of the present invention is to provide a Vortex Hydro Turbine in a freeing flow stream, river, or ocean current to create power with an exponential output when compared to an un-shrouded free stream system. The output was determined using advanced flow simulation software (CFD) that utilized near area effect and takes into account turbulence and friction. Target power output is calculated utilizing said software to determine the velocity through the blade system. This software was utilized to determine the size of the communications tubing, vortex and connections utilizing constant environmental profiles to achieve target power output.

Yet another object of the present invention is to have the front of the shroud and the two vortex chambers utilize the balanced flow of the water off of the front of the unit.

Still yet another object of the present invention is to provide a Vortex Hydro Turbine having an dual open-topped vortex chambers wherein funneled water enters and is allowed to rapidly rotate around and out of the chamber top, which creates a subsequent low pressure area in the center of the chamber that is fed to the backside of the turbine blade system.

An additional object of the present invention is to provide a Vortex Hydro Turbine having a vortex chambers whereby the strength of the vacuum created is a function of the height, width, inlet size, and geometry of the chamber, as well as the interrelationship between the chamber, inlet and depending tube size.

A further object of the present invention is to provide a Vortex Hydro Turbine having a spiral plate in the entrance and bottom of the vortex chamber that converts some of the horizontal motion of the water into vertical motion within the chamber, which enhances the strength of the vortex, and the low pressure within the system.

A yet further object of the present invention is to provide a Vortex Hydro Turbine having a depending conduit that is sized to optimize the flow/low pressure to the backside of the blade system.

A still yet further object of the present invention is to provide a Vortex Hydro Turbine having a tail pipe that allows a larger quantity of water or base amount of water to flow directly through the blade system from front to back of the unit thus allowing additional water flow through the blades over what the low pressure from the vortex alone provides.

Another object of the present invention is to provide a Vortex Hydro Turbine having a ring gear mounted to the outside of the blades, out of the flow path of the water so that a generator may be connected to the blades in a manner that will not interfere with or reduce the efficiency of the blade system.

Yet another object of the design is the hub in the center of the blades to utilize the inefficient area of the blades to help channel the flow through the more efficient portion of the blades and at a higher velocity than without the hub.

Additional objects of the present invention will appear as the description proceeds.

The present invention overcomes the shortcomings of the prior art by providing a low pressure state within and behind a blade system thereby creating an increased velocity/volumetric flow through said blade system and preventing stagnation of water flow behind the blades.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 7:
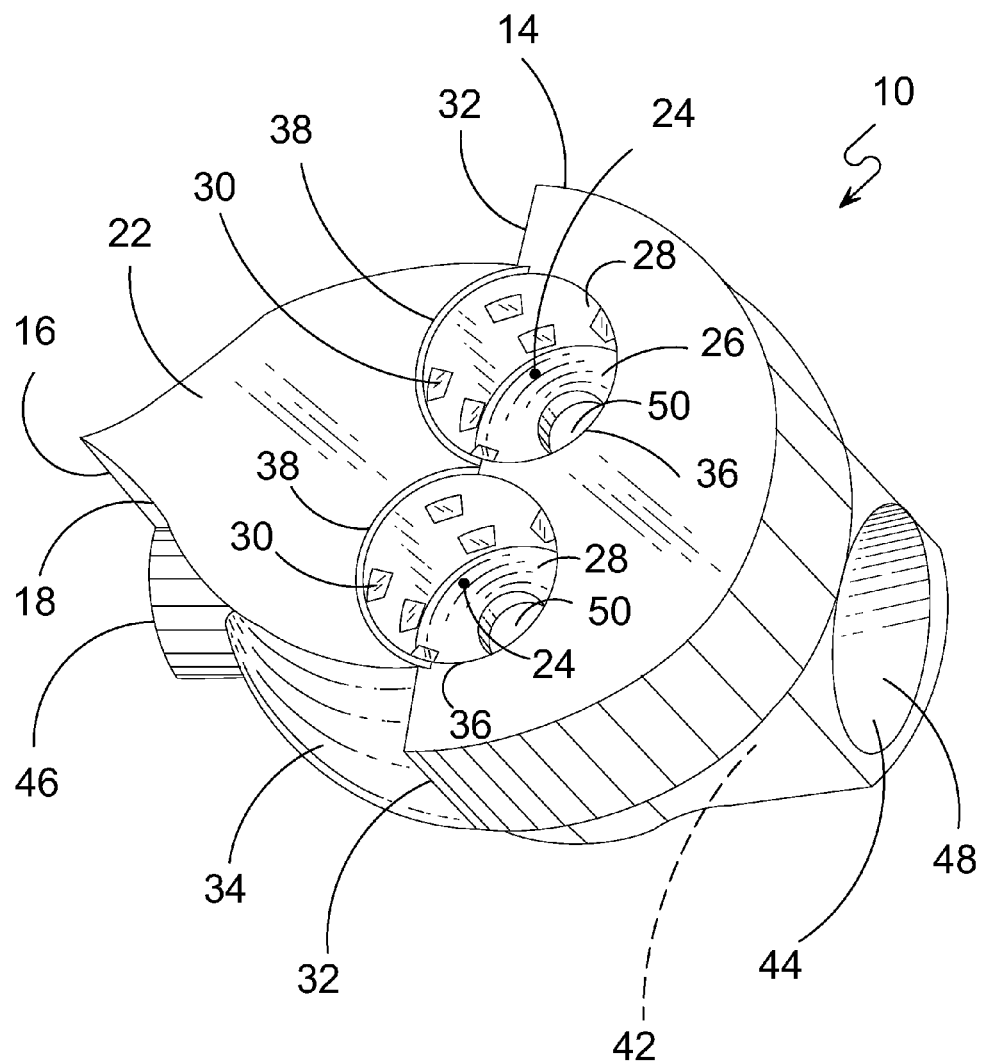
Figure 8:
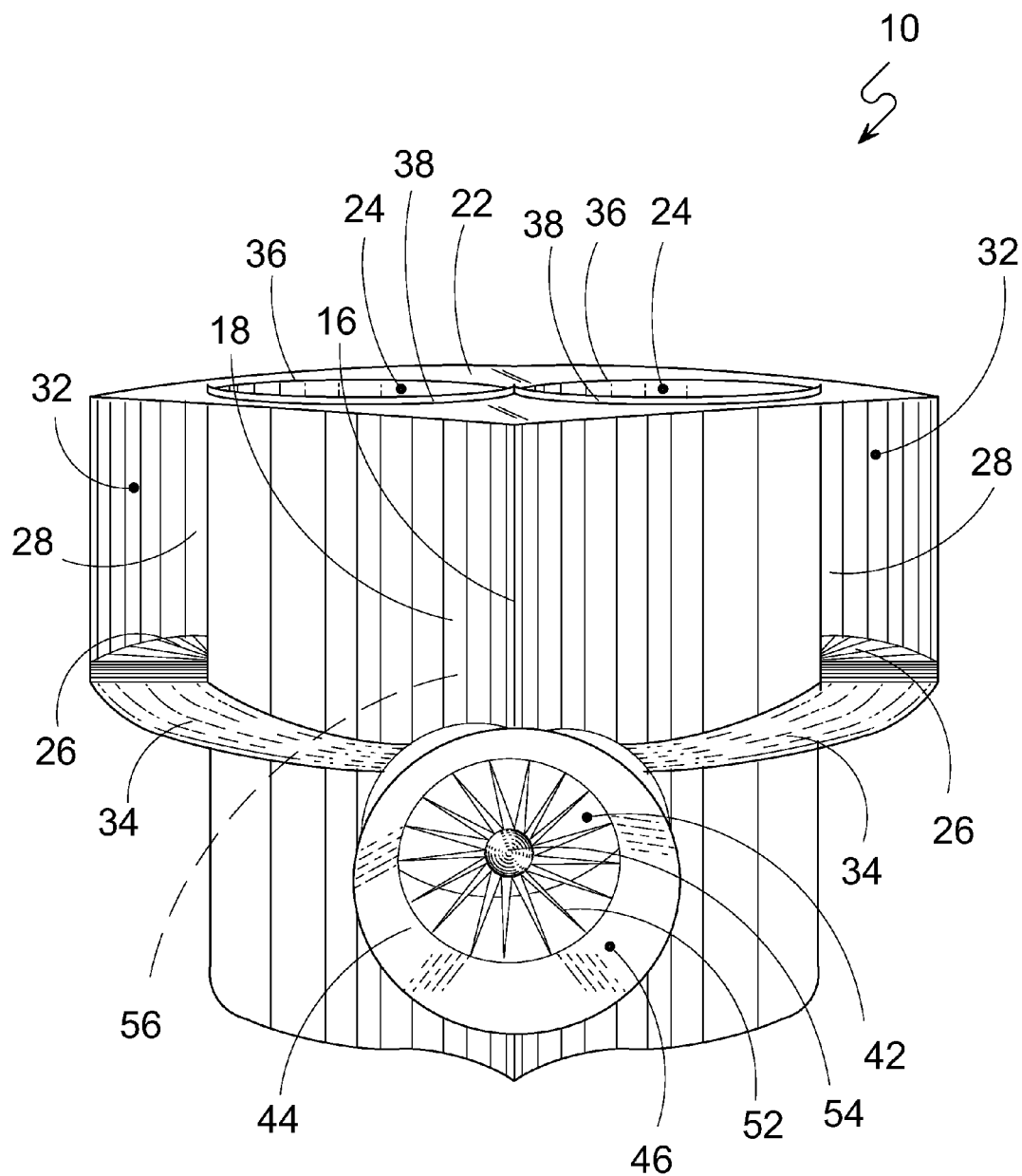
Figure 9:
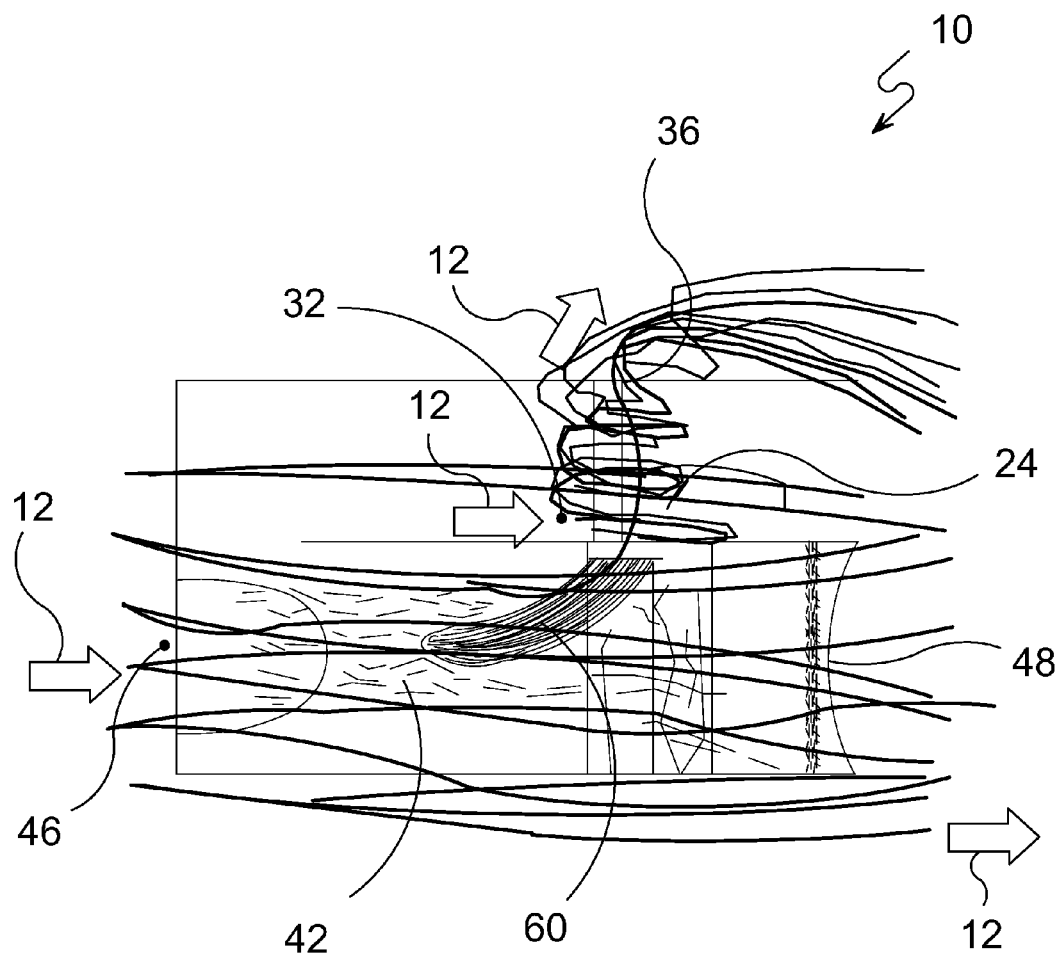

FIG. 7 view from above and behind vortex hydro turbine;

FIG. 8 is a front complete view with shroud;

FIG. 9 is an illustrative transparent side view of the particle trace through the unit as a free flowing fluid.

DESCRIPTION OF THE REFERENCED NUMERALS

Turning now descriptively to the drawings, in which similar reference characters denote similar elements throughout the several views, the figures illustrate the timing apparatus of the present invention. With regard to the reference numerals used, the following numbering is used throughout the various drawing figures.

10 vortex hydro turbine
12 free flowing fluid
14 housing of 10
16 diverter edge of 14
18 diverter wall of 14
20 vortex unit
22 vortex unit top 24 vortex chamber
26 vortex chamber sloped base
28 vortex chamber wall
30 flanges of 28
32 vortex chamber intake port
34 sloped intake of 32
36 vortex chamber outlet port
38 vortex chamber outlet port foil
40 turbine unit
42 turbine unit channel
44 turbine unit wall
46 turbine unit intake port
48 turbine unit outlet port
50 depending conduit interface
52 rotor blades
54 rotor hub
56 generator/drive gear
58 turbine ring gear
60 depending conduit

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
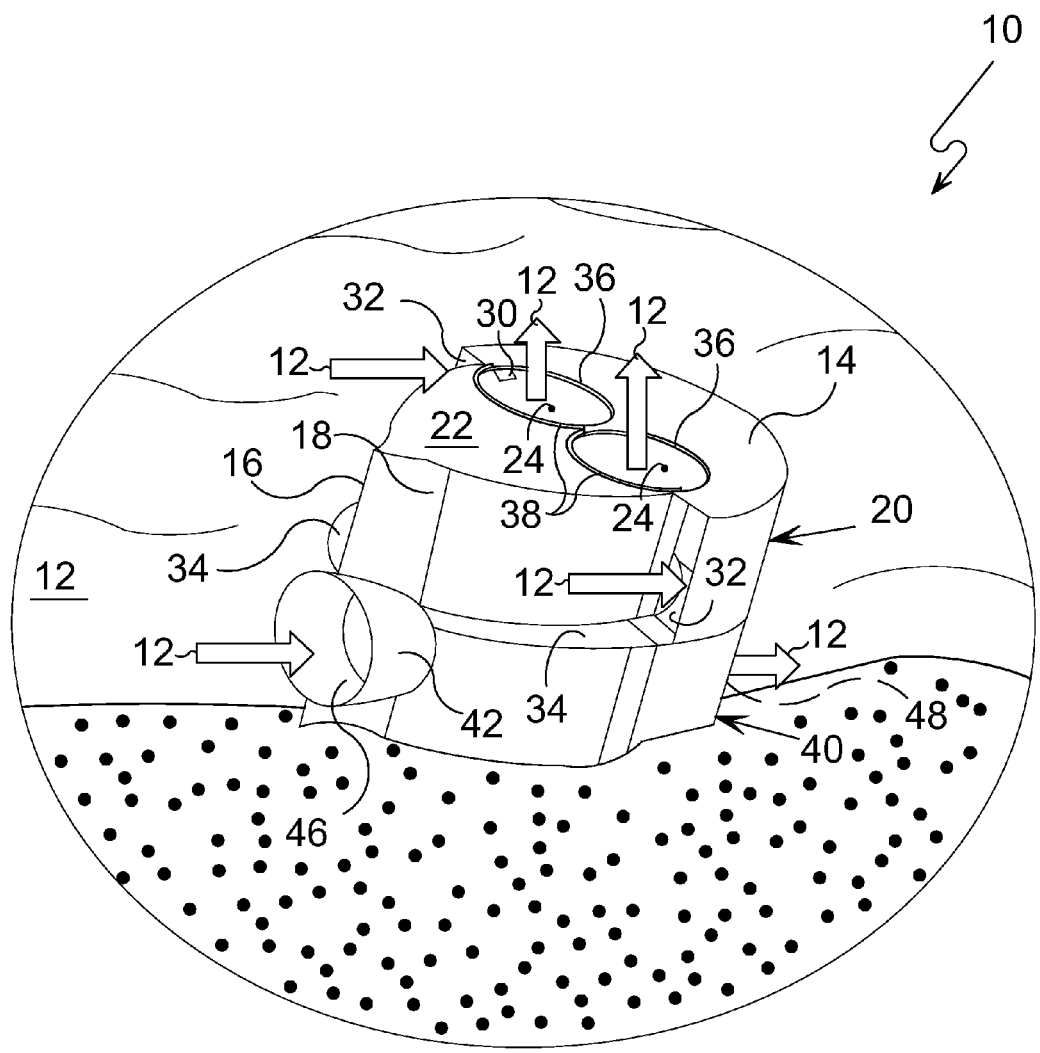
FIG. 1 is an illustrative view of the present invention in use.

Referring to FIG. 1 shown is an illustrative view of the Vortex Hydro Turbine of the present invention in use. Depicted is an embodiment of the Vortex Hydro Turbine 10 comprising housing 14 having a vortex unit 20 and a turbine unit 40 positioned within a free flowing fluid 12 forming a working fluid that is partially channeled through the vortex unit 20 and partially through the turbine unit 40 with the vortex unit portion designed to impinge a low pressure state behind the turbine unit blades. The vortex unit 20 provides a pair of side mounted vortex intake ports 32 with sloped intakes 34 providing a vertical lift to the free flowing liquid 12 as it enter vortex chamber intake port 32 that also has a vortex chamber sloped base 26 and wall mounted flanges 30 to channel the water into a vortex within a vortex chamber 24 that is vented through the vortex chamber outlet ports 36 having a free flowing fluid leading edge foil 38 that moves the water flowing across the top of the shroud/housing 14 creating a lower pressure pocket above the vortex chamber outlet 36 that stabilized the output of the chamber decreasing the fluctuation in output as the pressure would increase, release and then increase again. The turbine unit 40 has a venturi-like conduit 42 extending between a turbine unit intake port 46 and turbine unit outlet port 48 with turbine blades 52 positioned therein. The purpose of the present invention is to take part of a free fluid 12 and use it to create a vortex within vortex chamber 24 then impinge the low pressure at the base of the vortex within the turbine unit venturi-like conduit 42 behind the turbine blades 52 via depending conduit 60 thereby increasing the fluid flow 12 through the turbine unit 40.

Figure 2:
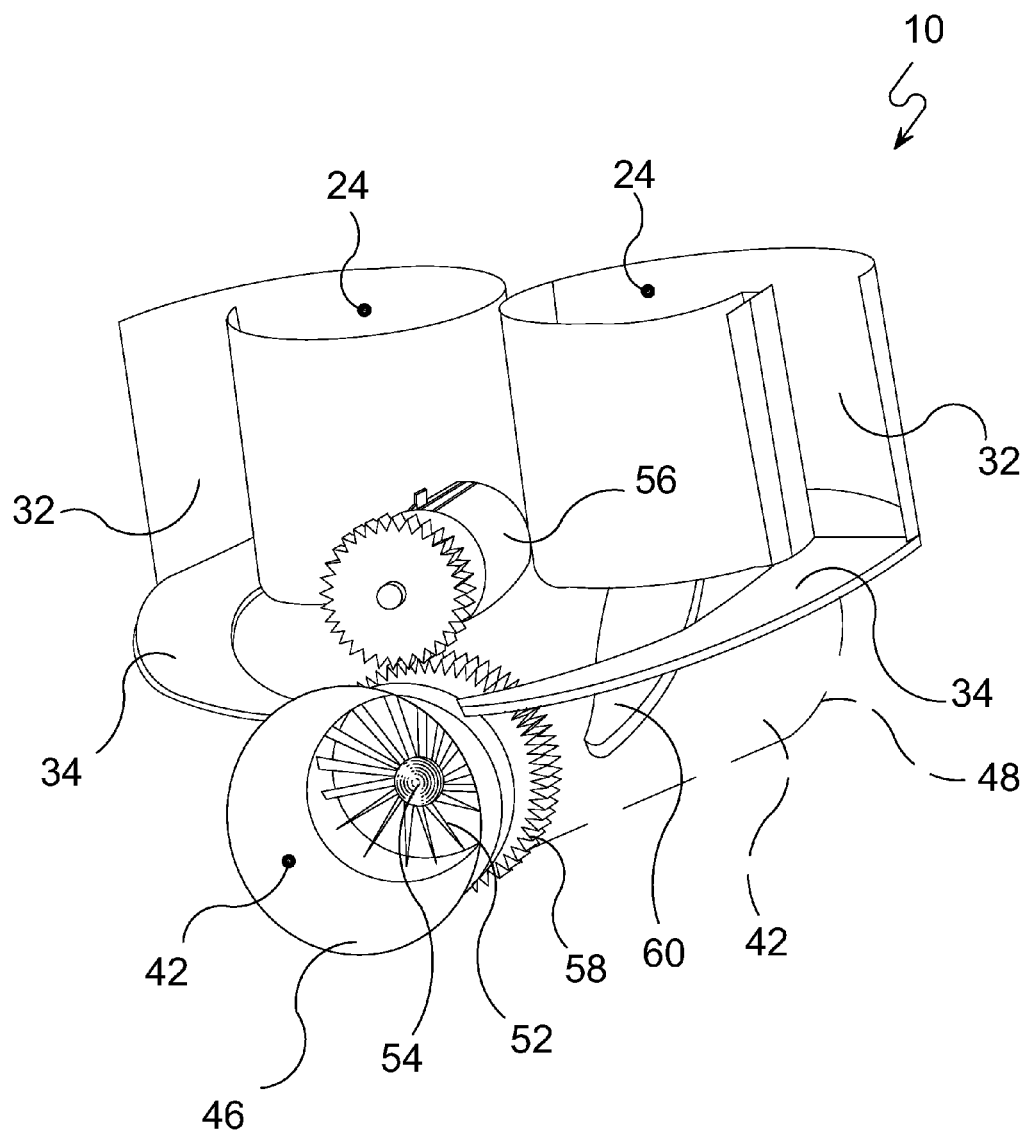
FIG. 2 is an oblique view of the whole unit without shroud.

Referring to FIG. 2 shown is a cutaway view of the vortex hydro turbine with the shroud/housing removed. The vortex hydro turbine 10 is designed to use a portion of a free flowing fluid 12 and use it to create a vortex within the vortex chamber 24 and a portion of the free flowing fluid 12 to drive turbine blades 52 within the turbine venturi-like channel 42. The base of the vortex chamber has an aperture extending through the turbine channel wall to impinge the vortexes low pressure into the free flowing stream behind the turbine blades thereby increasing the flow through the turbine channel. Also shown is the turbine unit 40 having turbine blades 52 and rotor hub 54 and generator/drive gear 56 connected to Rotor Ring gear 58.

Figure 3:
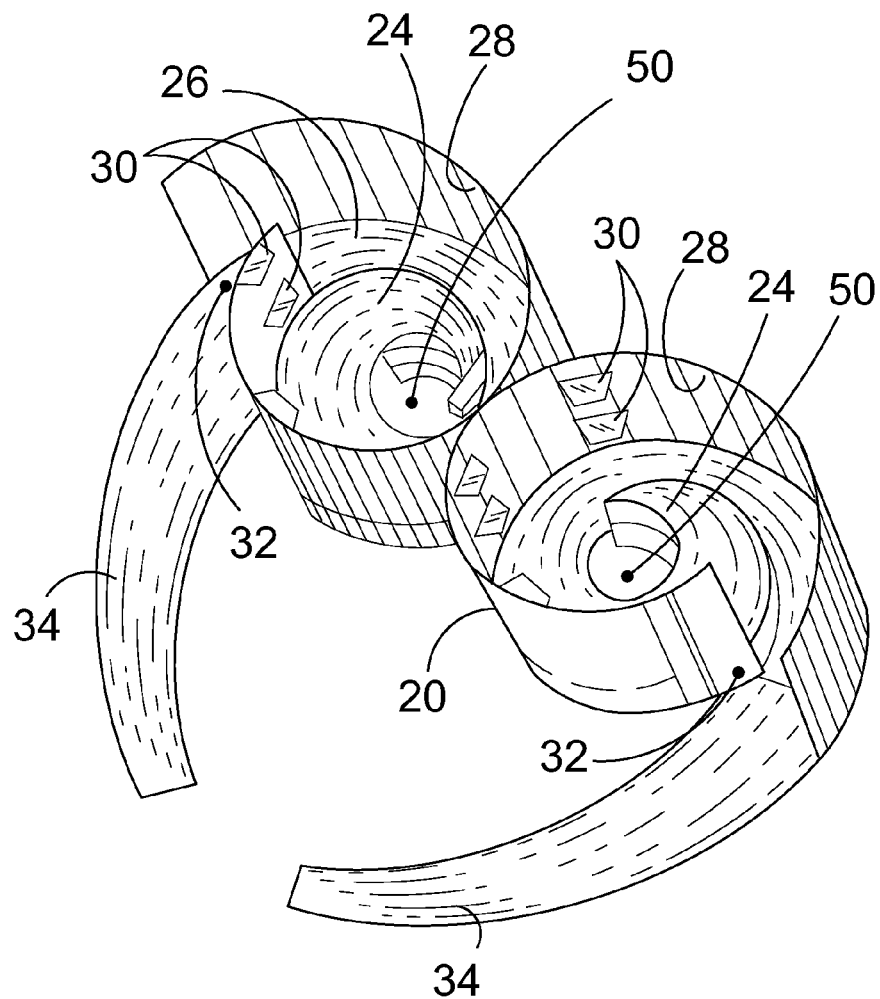
FIG. 3 is an oblique top view of the vortex unit without shroud.

Referring to FIG. 3, shown is the vortex unit 20 with housing 14 removed. The inclined approach 34 is at a gradient that optimizes flow into the inlet 32 to vortex chamber 24 that contains a spiral bottom 26. The inclined approach 34 and the spiral bottom 26 give the flow an initial vertical component that enhances the radial flow of the vortex. The vortex chamber wall 28 contains and shapes the incoming water from inlet 32 and creates the vortex. The tabbed vortex vanes 30 stabilize the vortex within chamber 24 and are inclined to optimize the vertical component. The low pressure generated by the vortices is transmitted through the depending conduit interface 50 allowing water to be drawn from the depending conduit 60 into the vortex chambers 24.

Figure 4:
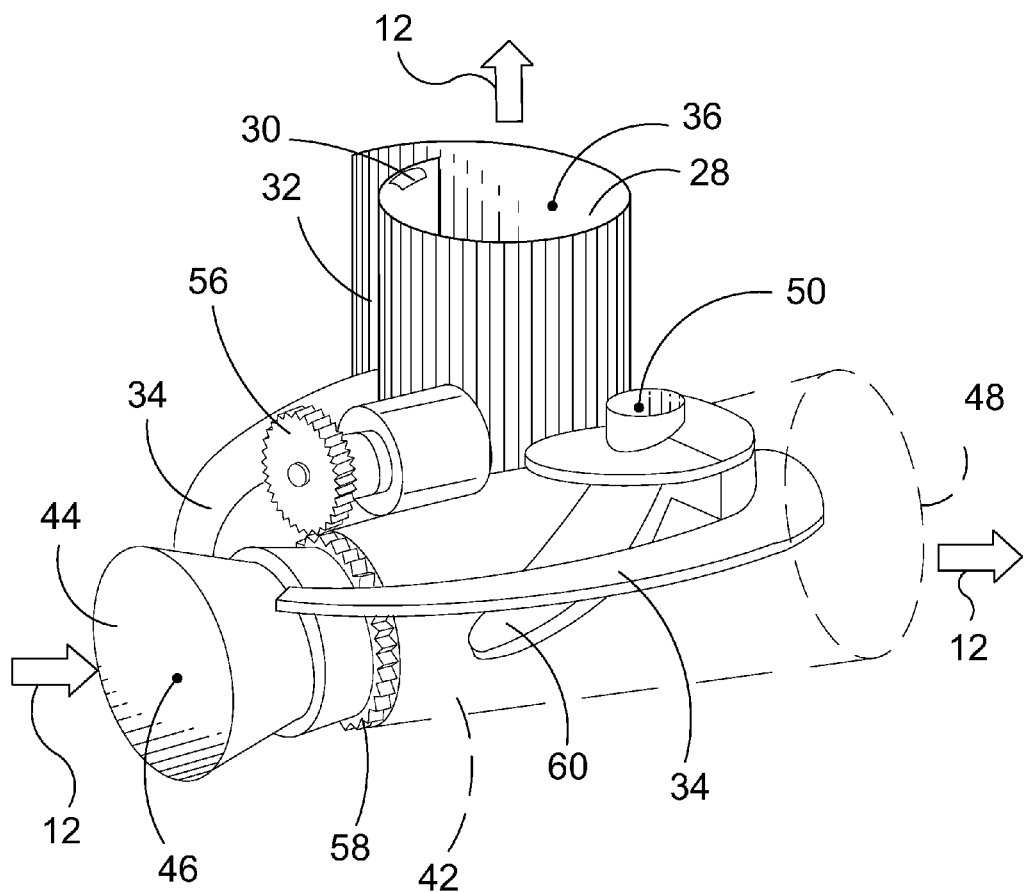
FIG. 4 is an oblique side view of the whole unit without shroud for clarification of inclined bottom of vortex unit.

Referring to FIG. 4, shown is a cutaway view of the vortex hydro turbine. is channeled through a pair of cooperating systems flow path of the water with the Vortex Chamber wall 28 hidden on one side to better show the path from the inclined approach 34 around the spiral bottom 26 and how the depending conduit 60 interfaces with the spiral bottom and thusly the vortex chamber 24. The slope of this path introduces a vertical component to the free flowing water that enhances the low pressure created at the center of the vortex chamber.

Figure 5:
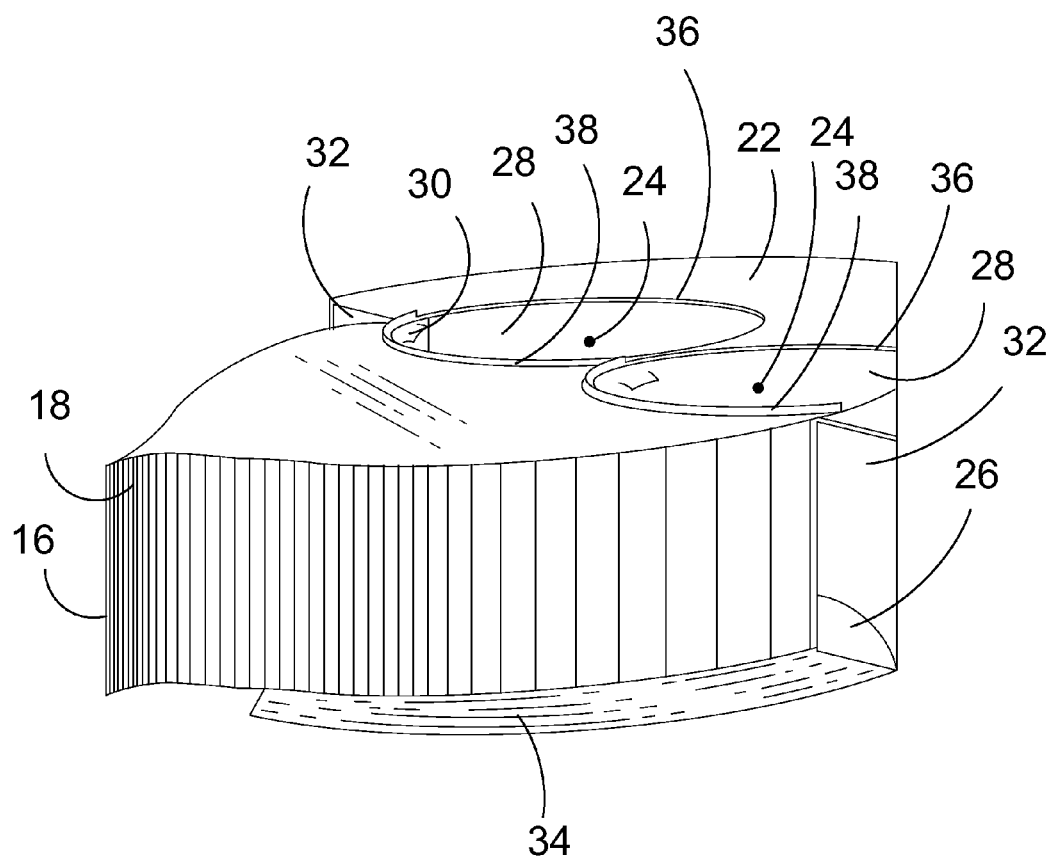
FIG. 5 is an oblique view of a portion of the top of vortex hydro turbine.

Referring to FIG. 5, shown is the top of the vortex hydro turbine. The vortex chamber outlet 36 is fronted by a foil 38 that moves the water flowing across the top of the shroud/vortex housing 22 creating a lower pressure pocket above the vortex chamber outlet 36 that stabilized the output of the chamber decreasing the fluctuation in output as the pressure would increase release and then increase again.

Figure 6:
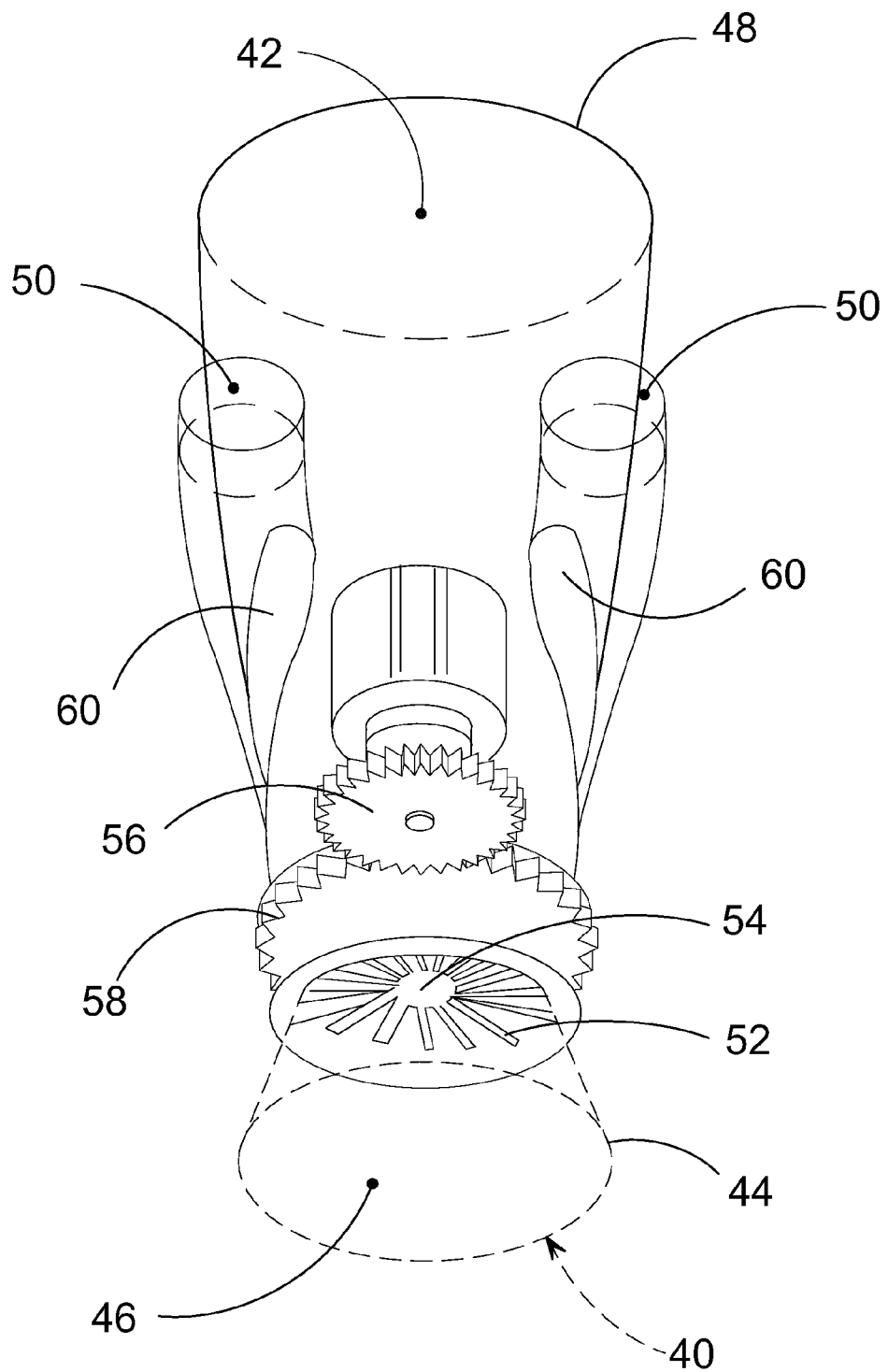
FIG. 6 is an oblique side view turbine unit without shroud.

Referring to FIG. 6, shown is an illustrated view of the turbine unit. The turbine unit 40 is created to have a natural flow from the inlet 46 to the outlet 48 this process is larger than the depending conduit 60 can overcome allowing water to flow through the blades and out the back this is the same as any shrouded system. The difference between this system is that as the water passes into the inlet 46 around the rotor hub 54 which is an obstacle to the water and causes the water to speed up around the hub 54 and into the rotor blades 52 this will cause the blades to spin and in doing so turns the turbine ring gear 58 which is in contact with the generator/drive gear 56 generating power. As the water passes blades 52 and turns them energy has been removed from the stream then the low pressure from the depending conduit interface 50 of FIG. 3 and the description from FIGS. 3 and 4 is supplied aft of the blades by the depending conduit 60 which from the depending conduit interface 50 evacuates the stagnate water from behind the blades 52 that can then be replaced with new water traveling through the blades, this causes an acceleration of the free flowing water 12 thru the turbine unit 40 over what the natural flow of the turbine unit 40 would be without the additional flow.

Referring to FIG. 7, shown is a view from above and behind vortex hydro turbine this view gives a better view of the inside of the vortex chamber 24 showing the tabbed vortex vanes 30. It also shows how the shroud/vortex housing 14 is shaped around the outlet 48 to allow the water flowing around the unit to separate from the shroud/vortex housing 14 instead of curling around the unit and back into the outlet 48.

Referring to FIG. 8, shown is the front complete view with shroud illustrating the profile of the unit as it would be presented to the oncoming water flow. Showing that the upper portion of the shroud/vortex housing 14 is symmetrical and that there are two of everything in the vortex chamber 24.

Referring to FIG. 9, shown is an illustrative transparent side view of the particle trace through the unit as a free flowing fluid 12. The water flows into turbine unit intake port 46 and vortex chamber intake port 32. The free flowing fluid entering intake port 46 travels through turbine unit channel 42 exiting from turbine unit outlet port 48. A portion of the free flowing fluid 12 within turbine unit channel 42 is diverted by the vortex low pressure 64 up the depending conduits 60 through the vortex chambers 24 and reintegrated into the environmental flow after exiting through the vortex chamber outlets 36.

What is claimed is new and desired to be protected by Letters Patent is set forth in the appended claims:

1. A vortex hydro turbine system leveraging a free flowing current to generate power comprising:
    a) a vortex unit having a symmetrical housing with a top wall, and a bottom wall with the housing having a leading edge conjoining a pair of opposing exterior curvilinear walls that terminate at a respective free flowing fluid inlet with the inlet having interior converging curvilinear walls forming a free flowing fluid passage to a respective vortex chamber where the free flowing fluid is channeled into a vortex;
    b) a turbine unit comprising a venturi-like conduit having a free flowing fluid inlet port and free flowing fluid outlet port with a turbine blade positioned therebetween and having a pair of apertures within the turbine unit conduit behind said turbine blade; and
    c) said apertures forming a fluid interface between a respective vortex chamber and the turbine unit whereby the vortex within a respective vortex chamber, each having a low pressure area that is impinged through a respective turbine unit aperture onto a back side of the turbine blade causing an increase of fluid through the turbine blade.

2. The vortex hydro turbine system of claim 1, wherein said vortex unit top wall has a pair of vortex chamber outlet ports forming free flowing fluid egress from a respective vortex chamber.

3. The vortex hydro turbine of claim 2, further providing a foil positioned along a front edge of the pair of vortex chamber outlet ports so that the free flowing fluid across the top of the vortex unit encounters the foil that lifts the fluid over the vortex chamber outlet port stabilizing the fluid in the vortex.

4. The vortex hydro turbine system of claim 1, wherein said vortex unit housing further provides positive sloped platforms extending approximately from a front portion of the vortex unit to a respective free flowing fluid intake port providing a vertical lift to the free flowing fluid as it enters a respective inlet.

5. The vortex hydro turbine system of claim 1, wherein said vortex chambers have a depending conduit extending to a turbine channel.

6. The vortex hydro turbine system of claim 1, wherein said vortex unit's bottom wall rises in spiral fashion about a respective depending conduit whereby the free flowing fluid forms the vortex within the respective vortex chamber.

7. The vortex hydro turbine system of claim 1, wherein the vortex chambers have a plurality of spaced apart vanes projecting from the chambers walls to enhance vortex formation.

8. The vortex hydro turbine system of claim 7, wherein said plurality of vanes are correspondingly sloped as a bottom wall spiral.

* * * * *